US011857507B2

(12) United States Patent
Van Kollenburg et al.

(10) Patent No.: US 11,857,507 B2
(45) **Date of Patent: *Jan. 2, 2024**

(54) INFANT FEEDING SYSTEM

(71) Applicant: KONINKLIJKE PHILIPS N.V., Eindhoven (NL)

(72) Inventors: Johanna Wilhelmina Maria Van Kollenburg, Best (NL); Sander Bogers, Budel (NL); Berkay Buharali, Utrecht (NL); Peter Lovei, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/700,566

(22) Filed: Mar. 22, 2022

(65) Prior Publication Data

US 2022/0211583 A1 Jul. 7, 2022

Related U.S. Application Data

(63) Continuation of application No. 16/094,292, filed as application No. PCT/EP2017/058916 on Apr. 13, 2017, now Pat. No. 11,324,666.

(30) Foreign Application Priority Data

Apr. 26, 2016 (EP) .................................... 16167028

(51) Int. Cl.
*A61J 9/02* (2006.01)
*A61J 9/06* (2006.01)

(52) U.S. Cl.
CPC . *A61J 9/02* (2013.01); *A61J 9/06* (2013.01); *A61J 2200/74* (2013.01)

(58) Field of Classification Search
CPC ............. A61J 9/02; A61J 9/06; A61J 2200/74
(Continued)

(56) References Cited

U.S. PATENT DOCUMENTS 6,177,940 B1 * 1/2001 Bond ..................... G06Q 10/08 600/300
2003/0063135 A1 * 4/2003 Liu ...................... G06Q 10/109 715/864

(Continued)

FOREIGN PATENT DOCUMENTS

CN 104490605 A 4/2015
CN 204352215 U 5/2015

(Continued)

OTHER PUBLICATIONS

"The Boom in Baby Tech", Deborah Weinswin, Fun Business Intelligence Centre, Global Retail & Technology, Dec. 1, 2015.

(Continued)

*Primary Examiner* — Robert P Bullington, Esq.
*Assistant Examiner* — Stephen Alvesteffer

(57) ABSTRACT

An infant feeding system for orally feeding a liquid to an infant is provided. The infant feeding system includes a user interface, at least one sensor for measuring at least one physical property, a memory for storing machine executable instructions, and a processor. Execution of the machine executable instructions causes the processor to: acquire feeding data by measuring the at least one physical property with the at least one sensor; send the feeding data to a feeding database; receive a user response descriptive of feeding conditions from a user interface; send contextual data to the feeding database, wherein the contextual data comprises the user response; receive instructional data from the feeding database in response to the contextual data and (Continued)

the feeding data; and output feeding instructions on the user interface using the instructional data.

17 Claims, 10 Drawing Sheets

(58) Field of Classification Search
USPC ........................................................ 434/262
See application file for complete search history.

(56) References Cited

U.S. PATENT DOCUMENTS

| | | | | |
|---|---|---|---|---|
| 2006/0074279 | A1* | 4/2006 | Brover | G16H 20/30 600/300 |
| 2006/0162341 | A1 | 7/2006 | Milazzo | |
| 2008/0159584 | A1 | 7/2008 | Kaneko | |
| 2009/0157428 | A1* | 6/2009 | Auchinleck | G16H 20/60 707/E17.014 |
| 2010/0131454 | A1* | 5/2010 | Kaplan | A23L 33/40 706/54 |
| 2014/0073252 | A1 | 3/2014 | Lee | |
| 2014/0242213 | A1 | 8/2014 | McCarty | |
| 2015/0024349 | A1 | 1/2015 | Bischoff | |
| 2015/0094830 | A1* | 4/2015 | Lipoma | A61B 5/0022 700/90 |
| 2015/0196247 | A1* | 7/2015 | Lau | G01F 1/363 600/301 |
| 2018/0197629 | A1* | 7/2018 | Zhou | G16H 20/60 |
| 2019/0096224 | A1* | 3/2019 | Shoham | G08B 21/182 |

FOREIGN PATENT DOCUMENTS

| | | | |
|---|---|---|---|
| CN | 104758187 | A | 7/2015 |
| CN | 104771317 | A | 7/2015 |
| CN | 204581995 | U | 8/2015 |
| CN | 104887533 | A | 9/2015 |
| CN | 104997642 | A | 10/2015 |
| CN | 105213198 | A | 1/2016 |
| FR | 2975897 | A1 | 12/2012 |
| WO | 2006034394 | A1 | 3/2006 |
| WO | 2009132334 | A1 | 10/2009 |
| WO | 2013187763 | A1 | 12/2013 |
| WO | 2016030586 | A2 | 3/2016 |

OTHER PUBLICATIONS

"Meet Sleevely" Apr. 27, 2014-Mar. 25, 2016 www.sleevely.com/sleevely/.

* cited by examiner

INFANT FEEDING SYSTEM

CROSS-REFERENCE TO PRIOR APPLICATIONS

This application is a continuation of U.S. Ser. No. 16/094,292 filed on Oct. 17, 2018, which is the U.S. National Phase application under 35 U.S.C. § 371 and claims the benefit of International Application No. PCT/EP2017/058916, filed on Apr. 13, 2017, which claims the benefit of European Application No. 16167028.6 filed on Apr. 26, 2016. These applications are hereby incorporated by reference herein.

FIELD OF THE INVENTION

The invention relates to the feeding of infants, in particular to training systems for the caregivers of infants.

BACKGROUND OF THE INVENTION

Infants may be fed with a baby bottle. A baby bottle typically comprises a bottle or vessel for containing a fluid and then a synthetic nipple which allows the infant to drink the fluid. A variety of liquids may be placed into a baby bottle to feed an infant. They include water, formula, pediatric electrolyte solution, and milk.

International patent application WO 2009/132334A1 discloses devices, systems and methods for measuring infant feeding performance. The device includes a body portion, a pressure sensor and an integrated circuit. The body portion includes a first end for receiving a fluid, a second end mateable with a feeding nipple, and a conduit in fluid communication with the first and second ends. The pressure sensor is disposed in the body portion, is in contact with the fluid in the conduit, and generates a signal representing a pressure of the fluid passing through the conduit during a feeding session. The integrated circuit is disposed in the body portion and is electrically connected to the pressure sensor. The integrated circuit receives the pressure signal and determines a feeding factor over the feeding session indicative of the infant feeding performance.

US patent application 2015/024349 discloses a method of using a liquid consumption device. The method comprises determining a hydration plan for a user based on parameters of the user using a computing system, receiving data from the liquid consumption device at the computing system over a period of time, aggregating the data received over the period of time to track liquid consumption of the user, and identifying the user is outside a threshold hydration level based on the aggregated data and the determined hydration plan.

SUMMARY OF THE INVENTION

The invention provides for an infant feeding system, a method of operating an infant feeding system, and a computer program product comprising machine-executable instructions in the independent claims. Embodiments are given in the dependent claims.

Examples may provide for an infant feeding system which may be used to educate caregivers on how to better feed an infant. The infant feeding system may be configured for orally feeding a liquid to an infant. During the feeding of the infant sensors are used to acquire feeding data which are descriptive of physical properties during the feeding. This data can be stored in a feeding database. In addition to the feeding (sensor) data acquired during the feeding, contextual data is also stored into the database. The contextual data may be descriptive of various feeding conditions and/or contain meta data which adds a context to the collected feeding data. For example data descriptive of the person feeding the infant can be collected. The contextual data can also contain a description of the conditions under which the feeding data was acquired.

The contextual data is then stored in the database also. Using both the contextual data and the feeding data trends and/or problems in feeding the infant can be identified. The combination of the feeding data and the contextual data can be used to select instructional data which can be output to a user as feeding instructions. The feeding instructions may have several benefits for the user. For example, they may be used to improve the caregiver's feeding and/or health of the infant. The receiving of the feeding instructions may also have subjective benefits such as improving the confidence of the caregiver that he or she is properly feeding the baby.

In one aspect, the invention provides for an infant feeding system for orally feeding a liquid to an infant. In other words, the infant system may be used for feeding a liquid to an infant through the infant's mouth. The infant feeding system comprises a user interface. The infant feeding system further comprises at least one sensor for measuring at least one physical property. The infant feeding system further comprises a memory for storing machine-executable instructions. The infant feeding system further comprises a processor. Execution of the machine-executable instructions cause the processor to acquire feeding data by measuring the at least one physical property with the at least one sensor. Execution of the machine-executable instructions further cause the processor to send the feeding data to a feeding database.

Execution of the machine-executable instructions further cause the processor to receive a user response descriptive of feeding conditions from a user interface. Execution of the machine-executable instructions further causes the processor to send contextual data to the feeding database. The contextual database comprises the user response. Execution of the machine-executable instructions further causes the processor to receive instructional data from the feeding database in response to the contextual data and the feeding data. Execution of the machine-executable instructions further cause the processor to output feeding instructions on the user interface using the instructional data. This embodiment may have the benefit that the addition of the contextual data enables the instructional data to be selected more accurately or more appropriately for the infant that is being fed.

Execution of the machine-executable instructions further cause the processor to receive a contextual data request from the feeding database in response to the feeding data. Execution of the machine-executable instructions further causes the processor to display a questionnaire on the user interface in response to receiving the contextual data request. The user response is received in response to displaying the questionnaire on the user interface. In this embodiment the data being sent to the feeding database may be used to select the contextual data. For example if a signature or group of sensor measurements indicate that there is a difference between how the baby is being fed it may be worthwhile to display a questionnaire to quiz the person feeding the infant to discover why the data is so different. For example the questionnaire may quiz the person feeding the infant as to the person's identity or to a change of location. In other examples it may also question if the infant is being fed at a radically different time than normal. This embodiment may be beneficial because it may enable customization of the questionnaire on the fly and in response to the particular feeding data that is received by the feeding database.

The user interface in different examples may take different forms. In one example it may be an audio system for receiving a voice command or data from a person feeding the infant. In other examples the user interface may for example be a touchscreen or a graphical user interface. For example the infant feeding system may include or incorporate a smartphone or other handheld portable computer system. In other examples processing power is located within the infant feeding system itself. The combination of data received from the user interface in the form of the user response provides a context to the feeding of the infant. For example various questions about the conditions or the person feeding or the actual liquid being fed to the infant may be provided.

In different examples, the outputting of the feeding instructions may be performed in different ways. The outputting of the feeding instructions may incorporate audio and/or visual information. When the user interface incorporates a graphical user interface or touch screen display at least part of the feeding instructions may be displayed graphically. In other examples the user interface may play an audio file or render an audio file which incorporates at least a portion of the feeding instructions.

In some examples, the sensor data is live streamed and sent to the feeding database. For example the full sensor data can be sent as packets to the feeding database. In other examples the feeding data may be aggregated or have statistics performed on it and then sent to the database. Streaming the full sensor data or aggregating the data may have different benefits in different situations. For example if all of the data is sent then a more detailed analysis of the feeding data in conjunction with the contextual data can be performed. If the data is first aggregated this may reduce the bandwidth of the data being sent to the feeding database.

In another embodiment, the feeding database is configured to use a pattern recognition algorithm with the contextual data and the feeding data to select the instructional data from pre-generated instructional data elements. There may for example be a pattern recognition algorithm such as a trained neural network which is used to select pre-generated instructional data elements. In other examples, the pattern recognition algorithm may at least partially comprise a decision tree or expert system. For example the contextual data may contain information on the identity of the person feeding the infant. In this case the pattern recognition algorithm may maintain separate stores of data so that the feeding instructions are customized for particular users.

In some embodiments, the pre-generated instructional data elements may comprise audio and/or visual information which are selected. For example the pattern recognition algorithm may be used to identify certain problems or difficulties with the infant being fed or with the behavior of the person feeding the infant. The pattern recognition algorithm can then be used to select the appropriate pre-generated instructional data elements. In some cases outputting the feeding instructions using the user interface are performed immediately after the feeding of the infant is completed. This outputting of the feeding instructions could include, for example, displaying graphical information and/or playing audio files. This for example may be useful if multiple people have been involved in feeding the infant. This may ensure that the correct message is delivered to the proper person. In other examples the feeding instructions may be displayed on the user interface when the system detects that a baby is being fed with the infant feeding system.

For example the at least one sensor may include an accelerometer which is able to identify the orientation of the bottle as well as sounds or other motions which are indicative of the infant being fed with the infant feeding system. This may then trigger the outputting of the feeding instructions such that they are displayed to the person feeding the infant. In other cases the outputting of the feeding instructions may be delayed by a predetermined amount from the starting of the feeding of the infant. For example the feeding instructions may contain information about how to properly feed the baby or a reminder to properly burp the baby after feeding. It would be advantageous to display this to the user or render an audio file about the time that the baby needs to be burped. The outputting of the feeding instructions on the user interface can therefore be performed at an appropriate time depending upon the nature or the message contained in the pre-generated instructional data elements. The pre-generated instructional data elements may for example contain meta data which is descriptive of when the feeding instructions should be output.

In another embodiment, the pattern recognition algorithm is any one of the following: a trained neural network, a decision tree, an expert system, and a cluster algorithm. For example clusters of data may be used to identify the proper pre-generated instructional data element.

In another embodiment, the feeding database is configured to use a request generation algorithm to analyze the feeding data to construct a contextual data request from pre-generated contextual data request elements. In this example a trained neural network, a decision tree, an expert system, and a cluster algorithm are all examples of how a request generation algorithm may possibly be implemented.

In another embodiment, the infant feeding system is a baby bottle.

In another embodiment, the infant feeding system is a baby bottle in combination with a sleeve which fits around the baby bottle.

In another embodiment, the infant feeding system is a sleeve for receiving a baby bottle.

In another embodiment, the at least one sensor comprises any one of the following: a temperature sensor for measuring a temperature of the liquid, an accelerometer sensor for measuring an orientation of the infant feeding system, an environmental light sensor for measuring an ambient light level, an environmental sound sensor for measuring an ambient sound level, a force sensor for measuring a weight of the liquid, and combinations thereof.

The incorporation of any one of these sensors may be beneficial because it may enable direct measurement of data, which is descriptive of how the infant is being fed. For example incorporation of a temperature sensor may enable direct measurement of the temperature of the liquid. This may have the benefit of providing a warning if the temperature of the liquid is too high or is dangerous for the infant. In other instances the infant may have a particular preference for a particular temperature of the liquid. The incorporation of the temperature sensor may enable more accurate determination of the feeding instructions.

For example the user response may indicate how satisfied the person feeding the infant thinks the infant is when receiving the food. This could be used for classifying the results of the temperature sensor in one example. The use of the accelerometer sensor may be used also for more than measuring the orientation of the infant feeding system. For example the accelerometer may be used to measure how much the infant is fidgeting or even the person feeding the infant is moving. The environmental light sensor may be useful because the amount of light when the infant is feeding may have an effect on how comfortable the infant is during the feeding process. The incorporation of the force sensor may be useful for measuring how much the infant has drunk of the liquid. This for example may be useful in determining nutritional information for the infant or even as one measure of how comfortable or satisfied the infant is.

In another embodiment, execution of the machine-executable instructions further cause the processor to determine an acquisition time period during which the feeding data is acquired. For example certain sensor conditions may be used to trigger or determine when an acquisition time period is. For example when the bottle is oriented in a particular position it may be part of the conditions to indicate when the infant is being fed. The acquisition time period is determined by applying at least one predetermined criterion to data measured by the at least one sensor.

In another embodiment, the at least one sensor comprises the accelerometer sensor. Execution of the instructions further causes the processor to determine an activity profile using the accelerometer sensor. The contextual data comprises the activity profile within a first predetermined time range before acquiring the feeding data. The first predetermined time range is before the acquisition time. This embodiment may be beneficial because the accelerometer sensor may be useful in determining motion of the infant and/or the person feeding the infant at a time prior to when the feeding begins. For example if the infant is on the move and is shopping with his or her parents the infant may be less comfortable than if the infant was at home.

Examining the accelerometer data before the feeding has started may be useful in providing a clue as to the context of the feeding. For example if the accelerometer sensor indicated that the infant was being moved between places immediately before feeding and then the infant was fidgeting during the feeding process it may be useful to move the data into a separate folder or to quiz the person feeding the infant about the feeding conditions.

In another embodiment, the at least one sensor comprises the environmental sound sensor. Execution of the instructions further causes the processor to determine a noise profile using the environmental sound sensor. For example the average noise or another statistical measure of the noise may be used to determine contextual data which comprises the noise profile within a second predetermined time range before acquiring the feeding data. The second predetermined time range is before the acquisition time. This embodiment may be beneficial because the environmental sound may be an indicator of the conditions that the infant is in or even the amount of stress or duress the infant is exposed to prior to feeding.

In another embodiment, the at least one sensor comprises the environmental light sensor. Execution of the instructions further causes the processor to determine an ambient light profile using the environmental light sensor. The contextual data comprises the ambient light profile within a third predetermined time range before acquiring the feeding data. This embodiment may be useful because the amount of ambient light before the infant is fed may affect how relaxed or stressed out the infant is. It may also be useful in quantitatively measuring the conditions that the infant may be exposed to prior to feeding.

In another embodiment, the infant feeding system comprises a handheld telecommunications device. For example, the infant feeding system may comprise a handheld telecommunications device that comprises the user interface. This may be beneficial because many individuals own handheld telecommunications devices such as smart phones. The processing power of the handheld telecommunications device may therefore be used to reduce the cost of the electronics which are incorporated into the bottle or other container for the liquid.

In another embodiment, the infant feeding system comprises the feeding database. The feeding database may take different forms. In one example the feeding database may be a database located on a remote server or computer. In this case the data may be sent in streams or aggregated form to the feeding database. Having the feeding database being a remote or central server may be beneficial because the results of outputting feeding instructions can be modified for many different users simultaneously.

In another embodiment, the feeding database may for example be incorporated into the sleeve on the bottle or even into a handheld telecommunications device. This may be beneficial because it may reduce the amount of data which needs to be transferred to a remote server and/or it also may provide for better privacy of the data regarding the infant.

In another embodiment, the processor sends the feeding data to the feeding database via a network connection. The processor sends the contextual data to the feeding database via the network connection. The processor receives the instructional data from the feeding database via the network connection.

In another embodiment, the infant feeding system further comprises an integrated bottle for holding liquid.

In another embodiment, the infant feeding system comprises a receptacle for holding an external bottle for holding the liquid. In the case where the infant feeding system comprises a bottle receptacle the bottle receptacle may for example be a sleeve which fits around a baby bottle and enables various sensors to take measurements. Therefore an example may be an infrared sensor for measuring temperature, a pressure sensor for measuring the weight of the fluid consumed and then other various sensors which are incorporated into the body or the internal portion of the receptacle.

In another aspect, the invention provides for a method of operating an infant feeding system. The infant feeding system is configured for orally feeding a liquid to an infant. The infant feeding system comprises: a user interface, and at least one sensor for measuring at least one physical property. The method comprises acquiring feeding data by measuring the at least one physical property with the at least one sensor. The method further comprises sending the feeding data to a feeding database. The method further comprises receiving a user response descriptive of feeding conditions from a user interface. The method further comprises sending contextual data to the feeding database. The contextual data comprises the user response. The method further comprises receiving instructional data from the feeding database in response to the contextual data and the feeding data. The method further comprises outputting feeding instructions on the user interface using the instructional data.

In another aspect, the invention provides for a computer program product comprising machine-executable instructions for execution by a processor controlling an infant feeding system for orally feeding a liquid to an infant. The infant feeding system comprises a user interface and at least one sensor for measuring at least one physical property. Execution of the machine-executable instructions cause the processor to acquire feeding data by measuring the at least one physical property with the at least one sensor. Execution of the machine-executable instructions further cause the processor to send the feed data to a feeding database. Execution of the machine-executable instructions further cause the processor to receive a user response descriptive of feeding conditions from a user interface. Execution of the machine-executable instructions further causes the processor to send contextual data to the feeding database. The contextual data comprises the user response. Execution of the machine-executable instructions further causes the processor to receive instructional data from the feeding database in response to the contextual data and the feeding data. Execution of the machine-executable instructions further cause the processor to output feeding instructions on the user interface using the instructional data.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is accessible to a processor.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the C programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

A 'hardware interface' as used herein encompasses an interface which enables the processor of a computer system to interact with and/or control an external computing device and/or apparatus. A hardware interface may allow a processor to send control signals or instructions to an external computing device and/or apparatus. A hardware interface may also enable a processor to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, bluetooth connection, wireless local area network connection, TCP/IP connection, ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) display, Electroluminescent display (ELD), Plasma display panel (PDP), Liquid crystal display (LCD), Organic light-emitting diode display (OLED), a projector, and Head-mounted display.

It is understood that one or more of the aforementioned embodiments of the invention may be combined as long as the combined embodiments are not mutually exclusive.

BRIEF DESCRIPTION OF THE DRAWINGS

In the following preferred embodiments of the invention will be described, by way of example only, and with reference to the drawings in which.

DETAILED DESCRIPTION OF THE EMBODIMENTS

Like numbered elements in these figures are either equivalent elements or perform the same function. Elements which have been discussed previously will not necessarily be discussed in later figures if the function is equivalent.

Figure 1:
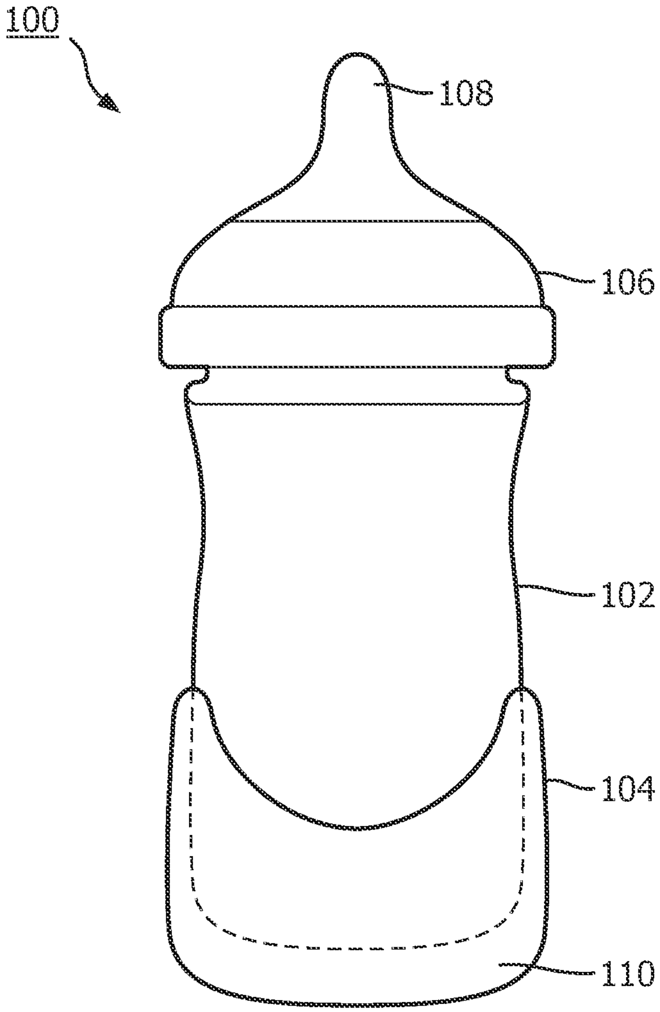
FIG. 1 illustrates an infant feeding system.

FIG. 1 shows an example of an infant feeding system. In this example the infant feeding system comprises a bottle 102 that is fit into a sleeve 104. The sleeve fits around a lower end of the bottle 102. In other examples the infant feeding system may comprise of only the sleeve 104. In yet other examples the components of the sleeve 104 may be integrated into a bottle 102. The bottle 102 is further shown as having a cap 106 with a nipple 108. When fluid is placed into the bottle 102 the bottle 102 can be partially inverted and the nipple 108 can be placed in the mouth of an infant so that the infant can be fed liquid that is within the bottle 102. The sleeve 104 in this example has a space 110 which may be used to place various sensors and the electronics. The electronics are illustrated in greater detail in FIG. 2.

Figure 2:
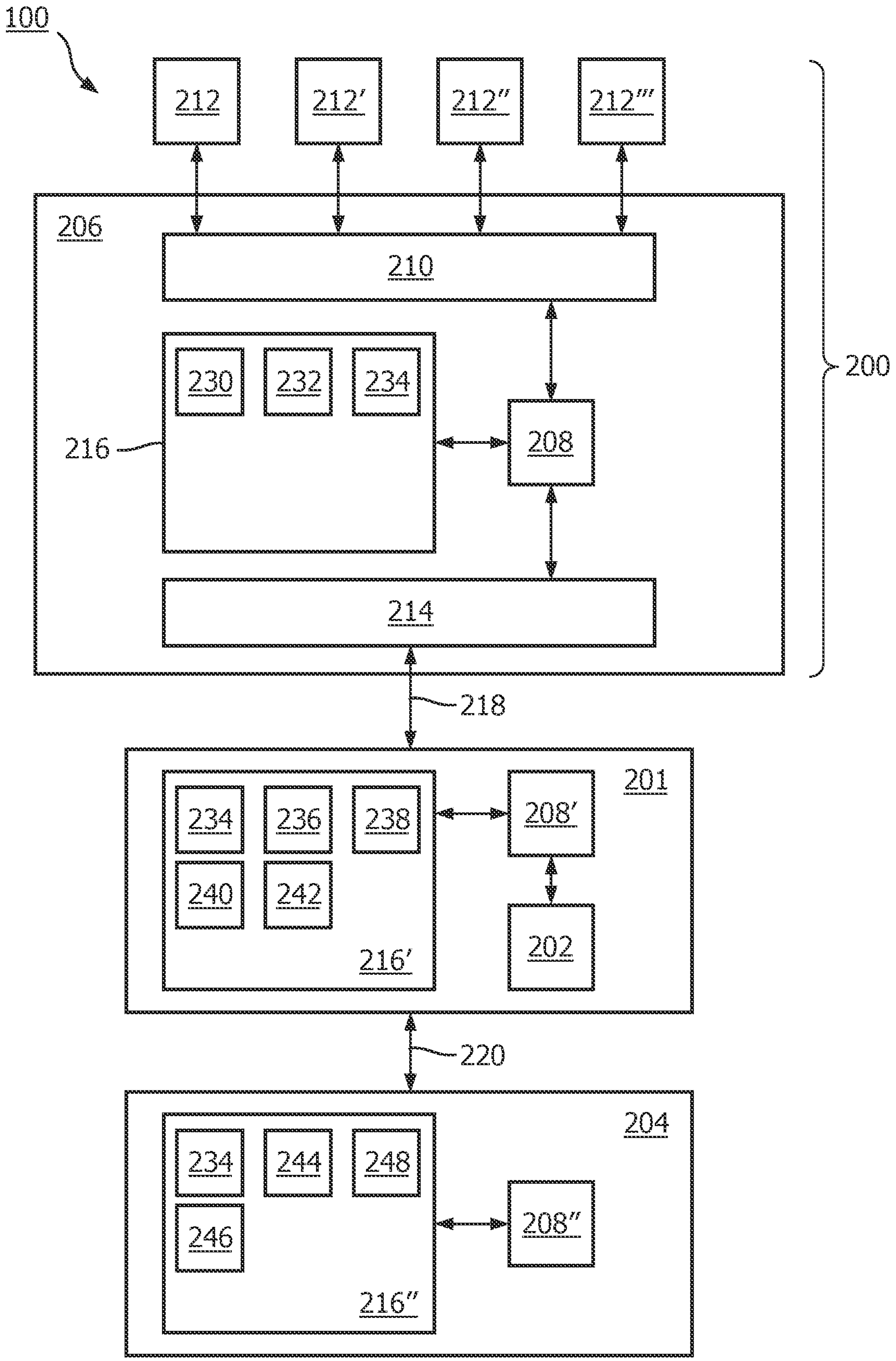
FIG. 2 further illustrates an infant feeding system.

FIG. 2 shows further possible components of the infant feeding system 100. In this example there are electronics 200 which may be located in the bottle 100. The electronics could for example be within the space 110 or also within various portions of the sleeve 104. Also shown in this example is a handheld telecommunications device 201 with a user interface 202 and a server 204 which contains the feeding database 246.

The electronics within the sleeve 200 comprise a controller 206. The controller 206 may for example be a small embedded computer or microprocessor. The controller 206 comprises a processor 208 that is in communication with a hardware interface 210, a memory 216, and a wireless interface 214. The handheld telecommunications device 201 is shown as containing a processor 208' and a memory 216'. The server 204 is shown as containing a processor 208" and a memory 216". The example in FIG. 2 is one example of how the computing and memory of the infant feeding system can be distributed. The processors 208, 208', and 208" as well as the memories 216, 216', and 216" can be combined.

The memory 216 may contain any combination of processor registers, volatile or non-volatile memory. The hardware interface 210 is connected to a number of sensors 212, 212', 212", 212'". The sensors 212, 212', 212", 212'" may be any combination of a temperature sensor, an accelerometer sensor, an environmental light sensor, an environmental sound sensor, and/or a force sensor. In this example sensor 212 is an arbitrary sensor, sensor 212' is an environmental light sensor, sensor 212" is an accelerometer sensor and sensor 212'" is an environmental sound sensor. The particular combination of sensors 212, 212', 212", 212'" is only exemplary. Different embodiments may have different combinations of sensors and the sensors 212, 212', 212", 212'" may or may not be present in other examples.

The wireless interface 214 may for instance be a Wi-Fi, Bluetooth or other wireless sensor which enables the processor 208 to send messages via wireless connection 218 to the handheld telecommunications device 201. In some examples the user interface 202 may be integrated into the bottle 102 or the sleeve 104. In this example the user interface 202 is separate from the electronics 200. For example the user interface 202 may be integrated into part of a handheld telecommunications device such as a smartphone with a touchscreen.

In the example of FIG. 2 the handheld telecommunications device 201 is shown as being connected to the server 204 via a network connection 220. The network connection 220 may for instance be a wired or wireless internet connection. The network connection 220 may also be a mobile telephone connection such as a digital telecommunications connection. In other examples the server 204 may not be present. For example the feeding database 246 may be incorporated into the user interface 202 or even into the controller 206. In different configurations all of the components of the infant feeding system may be incorporated into the sleeve 104. In other examples, the computing may be distributed.

The memory 216 is shown as containing sensor data 232 that has been acquired from one or more of the sensors 212, 212', 212", 212'". The memory 216 is further shown as containing machine-executable instructions 230 for controlling the operation of the electronics 200. The memory 216 is further shown as containing a data packet 234 of feeding data that has been constructed from the sensor data 232. The data packet 234 may for instance be raw data from the sensor data 232 or it may be an aggregation or partial aggregation of the sensor data 232. The data packet 234 may for instance be sent via the connection 218 to the user interface 202 and via connection 220 to the server 204. The memory 216' is shown as containing or storing the data packet 234. The memory 216' may also contain or store a contextual data request 236, a rendering of a questionnaire 238, a user response 240, and/or instructional data 242.

The contextual data request 236 could for example be received from the server 204. The instructional data 242 could also be received from the server 204. The rendering of the questionnaire 238 could be constructed using the instructional data 242. The memory 216" is shown as containing the feeding database 246 and a set of pre-generated instructional data elements 244. The server 204 may for instance be programmed to generate the contextual data request in response to receiving all or a portion of the data packets 234. The server 204 may also be programmed or configured for generating the instructional data 242 from the pre-generated instructional data elements. The memory 216" is also shown as containing contextual data 248 that is received by the network connection 220 from the handheld telecommunications device 201. In some examples the contextual data 248 may also contain or be comprised of sensor data 232 or aggregated sensor data.

Figure 3:
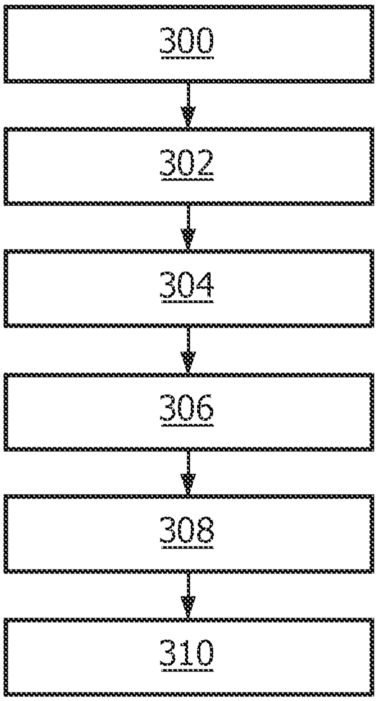
FIG. 3 shows a flow chart which illustrates a method of operating an infant feeding system.

FIG. 3 shows a flowchart which illustrates the method of using the infant feeding system 100 illustrated in FIGS. 1 and 2. First in step 300 the feeding data 232 is acquired. The feeding data may be the raw sensor data 232 or the data packets 234. Next in step 302 the feeding data 234 is sent to the feeding database 246. Then in step 304 the processor 208 receives a user response 240 descriptive of feeding conditions from the user interface 204. Next in step 306 the contextual data 248 is sent to the feeding database 246. The contextual data 248 comprises the user response 240. Next in step 308 instructional data 242 is received from the feeding database 246. This is in response to the contextual data 248 and the feeding data 234. Finally in step 310 the user interface 202 outputs feeding instructions 243 on the user interface using the instructional data 242.

In FIG. 2 the user interface 202 and the server 204 are also shown as containing processor 208. The various functions of the electronics 200, the user interface 202, and the server 204 may be distributed differently in different embodiments. The processor 208 may represent one or more distinct processors.

Figure 4:
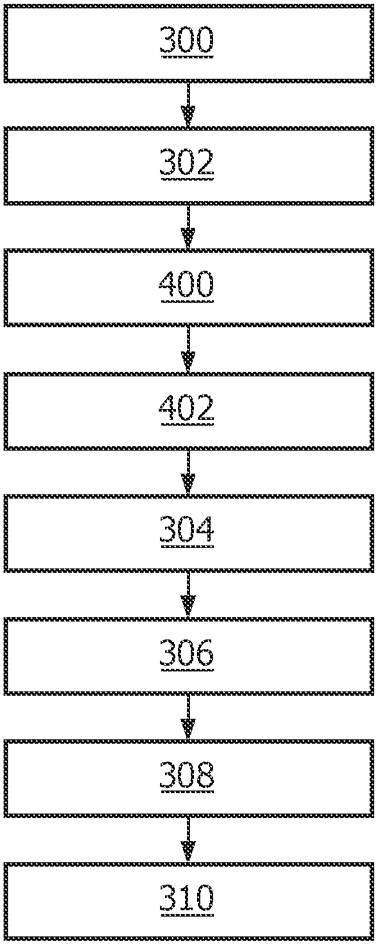
FIG. 4 shows a flow chart which illustrates a further method of operating an infant feeding system.

FIG. 4 shows a flowchart of a further method of operating the infant feeding system 100 of FIGS. 1 and 2. The method shown in FIG. 4 is similar to the method shown in FIG. 3 with the additions of steps 400 and 402 that are performed between steps 302 and 304. After step 302 is performed the user interface 202 receives a contextual data request 236 from the feeding database 246 in response to the feeding data 234. Then in step 202 the user interface 202 displays a questionnaire 238 on a display or other display system. Then the method proceeds to step 304 as described for FIG. 3.

Figure 5:
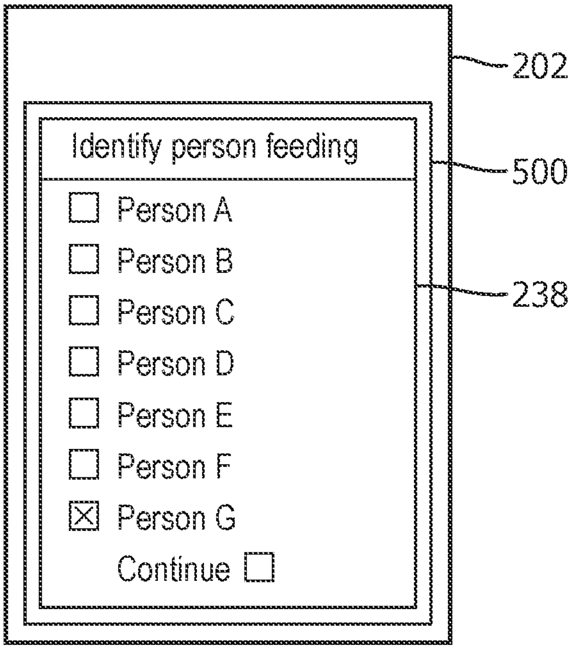
FIG. 5 illustrates a portion of a questionnaire displayed on a display device.

FIG. 5 shows an image which has an example of a user interface 202. The user interface 202 comprises a display 500. On the display is a rendering 238 of part of a questionnaire. In this example the rendering 238 contains a questionnaire which requests the identification of the person feeding the infant. This is an example of data which would not be able to be measured using the sensors 212, 212', 212", 212'.

Figure 6:
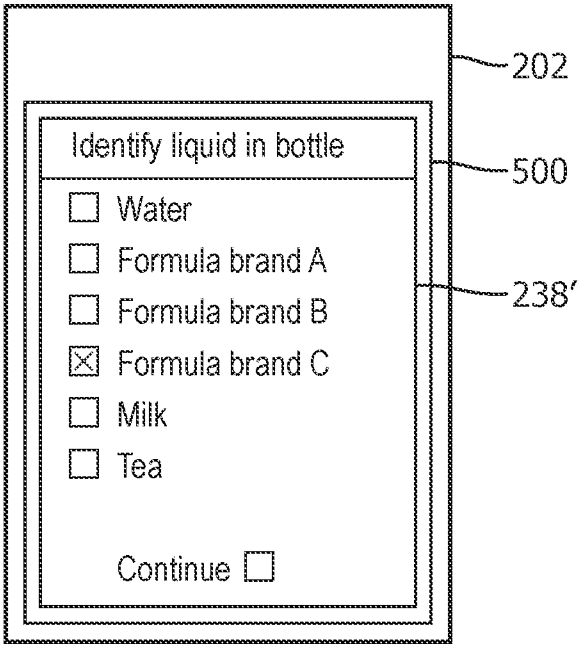
FIG. 6 illustrates a further portion of a questionnaire displayed on a display device.

FIG. 6 shows a further view of the user interface 202. On the display 500 is shown a further rendering 238' of a questionnaire. In this example the user is requested to identify the liquid within the bottle 102. This is another example of data which would be difficult to be determined by the sensors 212, 212', 212", 212'.

Figure 7:
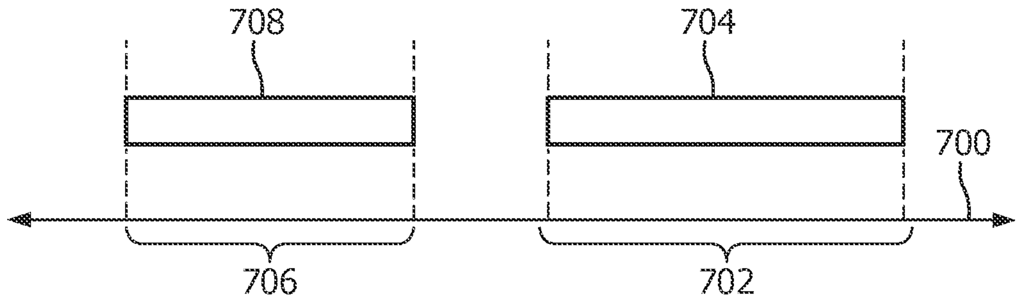
FIG. 7 shows a time line.

FIG. 7 shows a timeline 700. There is an interval 702 which is the acquisition time. The acquisition time is a period of time when the feeding data 704 is acquired. The acquisition time is determined by applying at least one predetermined criterion to data measured by the at least one sensor. Another interval marked on the timeline 700 is a predetermined time range 706. The predetermined time range is before the acquisition time period 702. During the predetermined time range 706 data may be measured which is used to determine an activity 708, an activity profile, a noise profile, or an ambient light profile. The data 708 or profile may be incorporated into the contextual data. The timeline 700 illustrates how data may be used to develop a context which is used for selecting the instructional data 242. The profiles 708 are acquired before the actual feeding of the infant starts. This for example may be stored in a log or buffer that is then recalled once the acquisition time 702 begins.

Parents typically use manual logging if they want to keep track of their bottle feeding. In these manual logs it is very hard to keep track of more than 2-3 characteristics (time, volume, temperature) of bottle feeding. Nevertheless, keeping a track of the feedings can reveal useful medical information and help the parents feel that their child is developing as expected. Furthermore, bottle feeding makes it possible that the babies are fed by more than one person. However, in this case manual logging of feedings becomes more difficult.

Examples may provide for a smart baby feeding bottle that eliminates the need for manual logging by using data collected by integrated sensors. The data is analyzed by a system or database, which an infant feeding system is connected to. The analyzed collected data may then presented for the parents using a display device. An infant feeding system was tested by 9 participants for three weeks.

The tests showed that the participants were enthusiastic about the infant feeding system. Five out of nine participants changed their feeding routine based on the instructional data provide to them. The infant feeding system may be providing these benefits by automatically detecting the feedings done with the smart bottle. An application for use with a smart phone was developed as part of the infant feeding system. In the application it is possible to look at all the feedings that were done using the infant feeding system, and find out more insights about them. Furthermore, in the application parents are able to find educational content and insights relevant to their own feedings. Based on the interviews some parents were able to solve the following problems:

Manual logging of feeding is not needed anymore. This is useful when the baby is born and parents have less experience but are asked to keep track of their feedings. Some parents found it beneficial to have all the information regarding their feedings available. All of the participating parents thought that the infant feeding system was convenient.

With the tested infant feeding system, it is possible to explore the whole feeding history, also when there is more than one person feeding the baby. Parents said that they were able to look through the logged data to find irregularities regarding feeding details.

Moreover, the tailored advice, the feeding instructions, that parents can receive via the application is helping them providing a better feeding experience to their child. Some parents also found the infant feeding system reassuring about the healthy development of their child and that they are feeding well.

The collected data of the infant feeding system may be made available at any time in a convenient way. The format of the data may also be adjusted to make it possible for each feeder to interpret it in their own way. This allows parents to come up with interesting insights about their child and their own feeding routine. The infant feeding system may provides a personalized way to interpret feeding data.

The analysis of the collected feeding and contextual data may makes it possible to provide insights for parents that were not possible before. Some examples of the infant feeding system may be capable of collecting information about the environment of the feeding. Based on this data, it may be possible to provide insights to the parents that are very hard to recognize otherwise. When something does not feel good parents report that they look for their own solution. However, having a system providing tips or feeding instructions may make it easier to look for a solution to a feeding problem. Parents were also happy to get messages that contained compliments. Examples of the infant feeding system may provide insights into unknown factors regarding bottle feeding.

The tested infant feeding system consists of three main elements: a server, a sleeve for a baby bottle, and an application for a mobile telephone. This complete system may make automatic logging of feedings possible. Furthermore it may provide a way for real-time data collection and real-time, two way communication with the users of the infant feeding system possible.

The server is the central element of the tested infant feeding system. It runs the software responsible for data collection, and contains the database where the data collected from the bottle is stored. It runs node.js (https://nodejs.org) and a mongodb (https://www.mongodb.org) database. The server runs three main software: an API for adding and retrieving data, and a dashboard to visualize, and organize the collected data and allow communication between the system and the users of the infant feeding system.

An API was developed for the infant feeding system which makes it possible to add sensor values, user comments, log the behavior of the users, and retrieve all this collected information. The server runs an analysis motor which makes the collected data understandable both for the users of the infant feeding system and for and researchers interested in the collected data. The API was developed in node.js using the Express framework (http://expressjs.com) and uses mongoose (http://mongoosejs.com) for object modelling, of the database records.

The tested infant feeding system also comprised dashboard an application to see the collected analyzed data. It may allow its users to find correlations between the collected sensor data and user input from the application. Moreover, the dashboard is the interface to communicate with the users of the infant feeding system and it also gives an overview about the communication history.

The application was developed for a fifth generation iPod touch. It uses the AFNetworking SDK (http://afnetworking.com) to communicate with the server and the LightBlue Bean SDK (https://github.com/PunchThrough/Bean-iOS-OSX-SDK) to communicate with the bottle sleeve over Bluetooth Low Energy.

The bottle sleeve was prototyped as a 3D printed sleeve for Philips Avent baby feeding bottle. Inside the sleeve there is a LightBlue Bean which is an Arduino computer containing a Bluetooth Low Energy chip for communication with the iOS device. There are 6 sensors, and an SD card connected to it.

Figure 8:
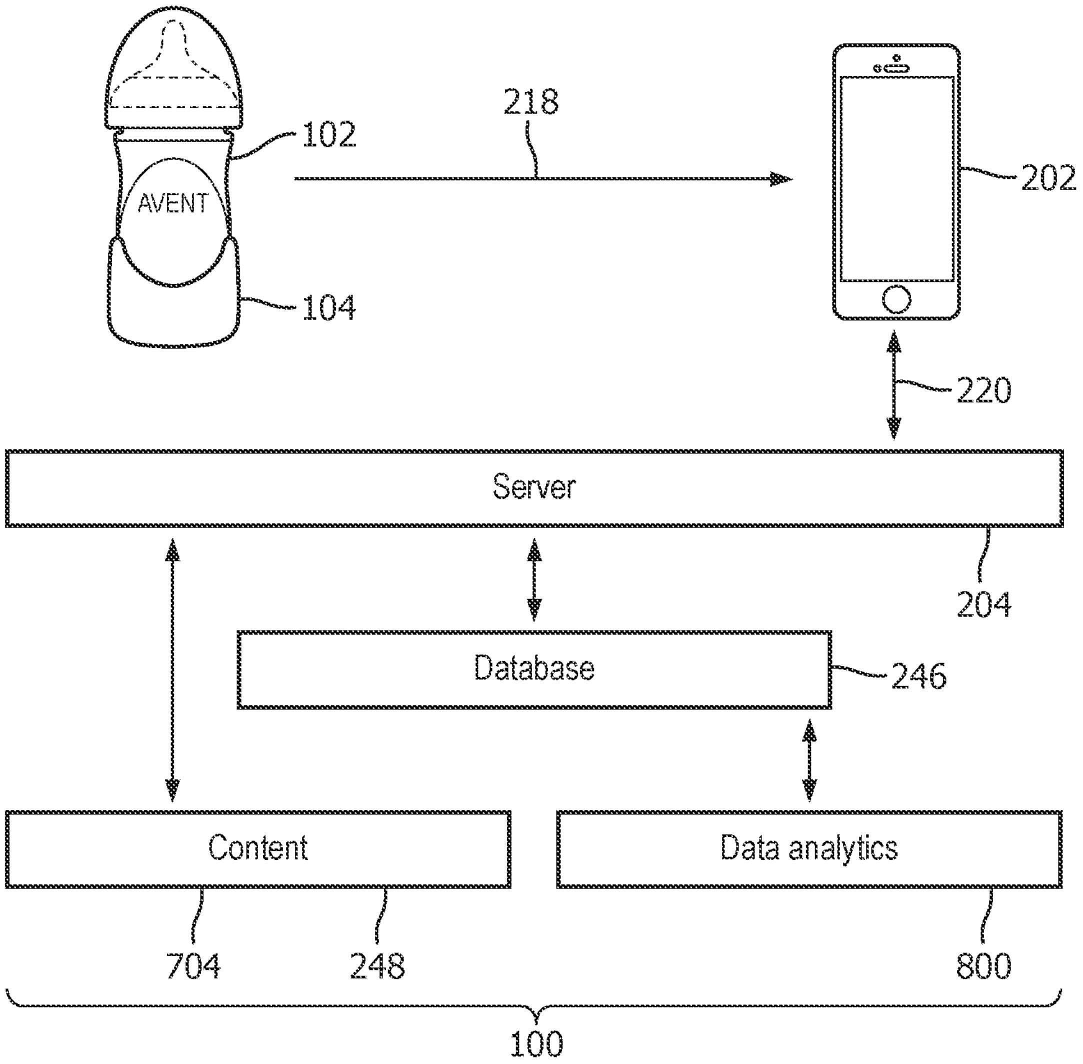
FIG. 8 shows a further example of an infant feeding system.

FIG. 8 shows an example of an infant feeding system 100. The infant feeding system is shown as containing the bottle 102 and sleeve 104. The sleeve 104 then sends data to a user interface 202. In this example it is a smartphone or handheld computing device. The user interface is in connection with a server 204. The server stores content for feeding data 704 and contextual data 248. The database 248 has a data analytics engine 800 that is used to analyze the feeding data 704 and the contextual data 248. The data analytics engine 800 may be used also for generating the contextual data request 236 and/or generating the feeding instructions 243.

Figure 9:
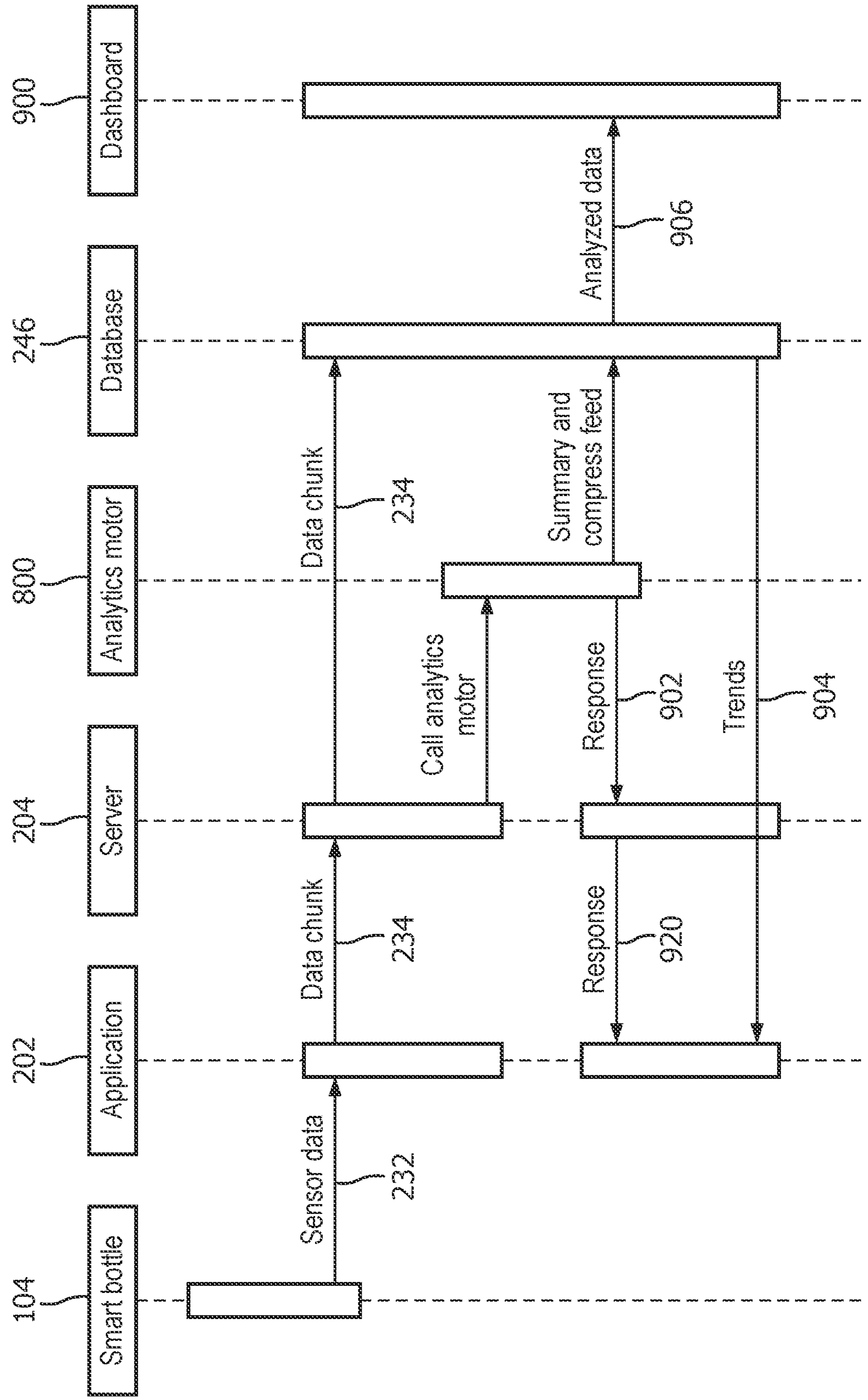
FIG. 9 shows a diagram which illustrates the functioning of the feeding system shown in FIG. 8.

FIG. 9 shows a further example of how to operate an infant feeding system. The example shown in FIG. 9 shows the interaction of several different components. These include a smart bottle 104, an application hosted by a user interface 202, a server 204, an analytics motor 800, a database 246 and a dashboard 900. The dashboard 900 may be used by a user to analyze data stored within the database 246. In the example shown in FIG. 9 the smart bottle 104 pushes raw sensor data 232 to an application 202. The application 202 then pushes a data chunk 234 to the server 204. The server 204 then stores this in the database 246 and also sends it to the analytics monitor or motor 800. The analytics motor 800 may then for example use the feeding data and the contextual data to generate a query for the database 246. This may then result in a response 902 which is then pushed out to the server and ultimately to the user interface 202. The response 902 may for example be the feeding instructions 243 and/or the contextual data request 236.

The database 246 may also directly push out trends 904 which are identified in the feeding data 234. The dashboard 900 may be used by operators to extract data 906. The analyzed data 906 may include data which is used for maintenance of the database 246 and/or the analytics motor 800 or it may also include data which is extracted from the database 246 which may be useful for marketing or for determining health trends of a large collection or ensemble of infants.

The working mechanism of the infant feeding system is explained using FIG. 2 above. First, the bottle sleeve sends sensor data to the application in real time. After all data is arrived to the application, application sends data chunk to the server. Server saves data to the database and calls the analytics motor script. Analytics motor analyses the data and saves the analysed data in the database. After this moment the data can be seen on the dashboard and in the application.

The tested bottle sleeve contains a thermometer, an accelerometer, an environment light sensor, an environment sound sensor, a force sensor, a real time clock, an SD card and a Bluetooth Low Energy chip for communication. The sensors can be used to collect data about the following things.

Temperature sensor is used to check temperature of the liquid.

Accelerometer sensor is used to check position of the bottle.

Environment sensor is used to check environment light level.

Environment sound sensor is used to check environment sound level.

Force sensor is used to check weight of the liquid.

Real timestamp is used to store real timestamp.

Writing SD card is used to store data in a local storage.

Bluetooth connection is used to connect other products or applications.

Motion detection may be used to cause the infant feeding system to start logging data. In the tested example, the infant feeding system produces data around every 115 milliseconds and stops logging 30 seconds after the last interaction. The bottle sleeve sends data line by line to the application via Bluetooth and writes in an SD card in real time to log data locally.

The application on the smart phone may be used to check data received from the bottle sleeve. It may check for missing values. If there is a missing sensor value, it may be configured to ignore a portion of the data. The application may also check if the bottle sleeve is in a charging dock and/or when the sleeve was last charged. When the application detects that the bottle is on the dock for at least 10 seconds it sends the collected sensor values to the server. This action also happens in case the bottle has not collected any data in the last 15 minutes. The 15 minutes threshold was defined according to previous information collected about bottle feeding through another experiment of Philips Design, based on the test it was determined that it is possible to have some interruptions up to 15 minutes during the feed. However, sending data once the bottle is placed on the dock was enabled in order to complete the process faster. Moreover, the application can only send data to the server if internet connection is available.

The server receives data depending on the Internet connection. Afterwards, the data is saved in the database. This is when the first analysis motor script is triggered, after data is saved to the database, with the ID of the arrived and saved data chunk. Then first analytics motor runs to analyse data. First, the analysis motor executes 5 steps:

First, it uses a timestamp value to check if the feed exists in the database or not. Because some feeding data packets from the same feeding might arrive at the same time to the server.

If the dataset does not exist, it checks the length of the raw data. If the data contains too few elements or measurements, it may be evaluated as a not feeding data.

After the duration check, maximum temperature is defined from the dataset. If maximum temperature is less than 28 centigrade and it arrives from a caregiver who does not give water to his/her baby, feeding is evaluated as not feeding.

Feedings are defined based on z-axis value (rotational position). Therefore, analysis motor searches first and last 10 consecutive negative z-axis values acquired from the accelerometer. First 10 consecutive values are defined as a start point of the feed and last 10 consecutive values are defined as an end point of the feed.

After start and end points are defined averages, standard deviations and median values of the x-axis, y-axis, z-axis, temperature, sound level, and light level are calculated. Additionally, duration of the feed and interruptions are calculated in this part. Duration of the feed is calculated based on the number of data samples. At the end of the feeding, the caregiver is asked for user responses to provide contextual data. In tests, users would consistently provide responses when 5 of fewer questions were asked. However, more of fewer user responses may be prompted for. Examples of possible questions for a user response may possibly include: happiness level of the baby, satisfaction level of the parents, content of the feed and volume of the feed, are sent to the application. The users can answer all questions or say, “this is not a feed”. Afterwards, the application sends the answers to the server.

The server runs a second analysis motor script after receiving the answers of the after feeding questions. If the answer is “this is not a feed”, it deletes summary and assigns the log as a not feeding. Otherwise, it continues to analyse the data. First, it checks count of interruptions. If it is more than threshold, it sends card, which asks the reason of the interruption. These thresholds are defined based on the data of the users. Afterwards, compress logs, which are compressed version of the raw data, are created. These logs are created in two types, which are one second and four seconds interval. Compress logs are used to create visualizations and event logs. The compressed data may be created this way because it may not possible to show all data points in one visualization. At the end of this section, all data becomes visible in the dashboard and the application.

Dashboard and Interaction

After the analysis, data is reachable from the dashboard. This dashboard is created for researchers. Researchers can see data and send cards to the participants. Feeding instructions may be referred to as “cards” herein. Cards may possibly provide tips, show correlations, and learning insights.

Five Examples of Pre-Defined Card Types of the Dashboard are the Following:

Questionnaire card: This type of card makes it possible to ask questions from the users of the infant feeding system. It contains a question and pre-defined answer possibilities from which the users can choose one. It is also possible to define an “Other” field which the users can use to give answers that cannot be found in the pre-defined list Education card: This type of card makes it possible to send coaching messages to the participants. It contains a header describing the content of the card, the educational content, reference to the source of the content, an image that is shown in the newsfeed of the participant, and it is possible to define the background color to be shown in the application behind the content of the card.

Insight card: This type of card makes it possible to send insights to the data collected from the users of the infant feeding system. It contains a header, the description of the insight, the value of the data the researcher wants to give insight, and the unit of the data Half Manual card: This type of card makes it possible to send out an image of pre-defined size. The image can contain any kind of content that the researcher wants to share with the participant.

Figure 10:
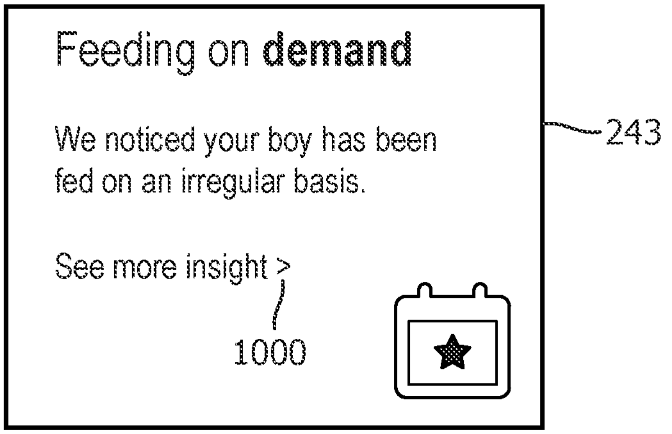
FIG. 10 shows an example of feeding instructions.
Figure 11:
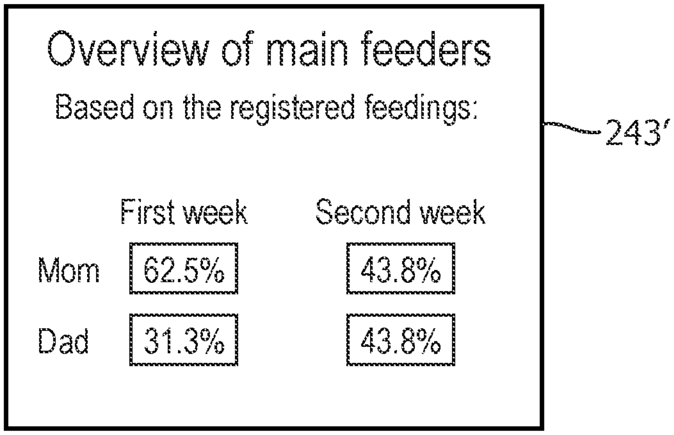
FIG. 11 shows a further example of feeding instructions.

Half Full Manual card: This type of card is very similar to the half manual card but it is possible to choose what content is shown after the users of the infant feeding system click on the card in their newsfeed. There are two possible choices available for this content, it is possible to create an image that is shown on the full screen of the handheld device, or to define an url that is loaded when the participant clicks on the sent out image FIG. 10 shows an example of a rendering of feeding instructions 243 on a display. In this example the instructional data 242 contains information which illustrates an example of data determined by analyzing the feeding data. There is a region 1000 which contains a control where the user may click for more information. FIG. 11 shows a further example of feeding instructions 243'. In the example shown in FIG. 11 is a summary of some contextual data. In this example an identification of who was feeding the baby in a first week and second week is displayed.

Figure 12:
FIG. 12 shows a further example of feeding instructions.

FIG. 12 shows a further example of feeding instructions 243". In the example shown in FIG. 12 the feeding instructions 243 contain data relevant to meta data descriptive of the user's participation in storing data in the feeding database 246.

Figure 13:
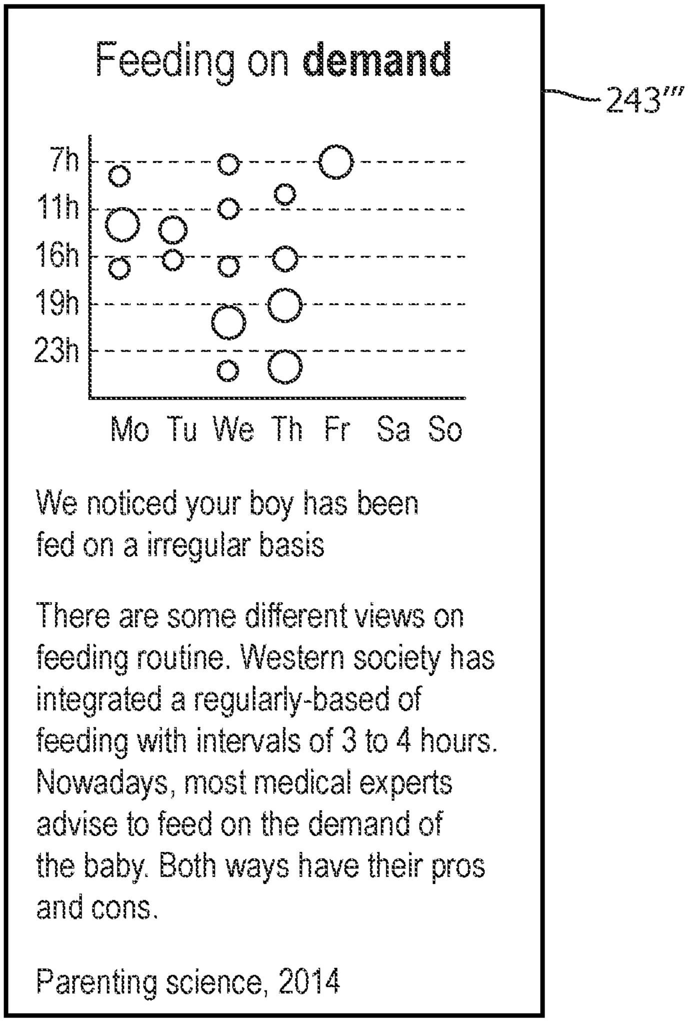
FIG. 13 shows a further example of feeding instructions.

FIG. 13 shows a further example of feeding instructions 243". In this example detailed data descriptive of how the infant has been fed regularly is displayed. The figure shown in FIG. 13 may for instance be displayed in response to clicking on the control 1000 in FIG. 10.

Figure 14:
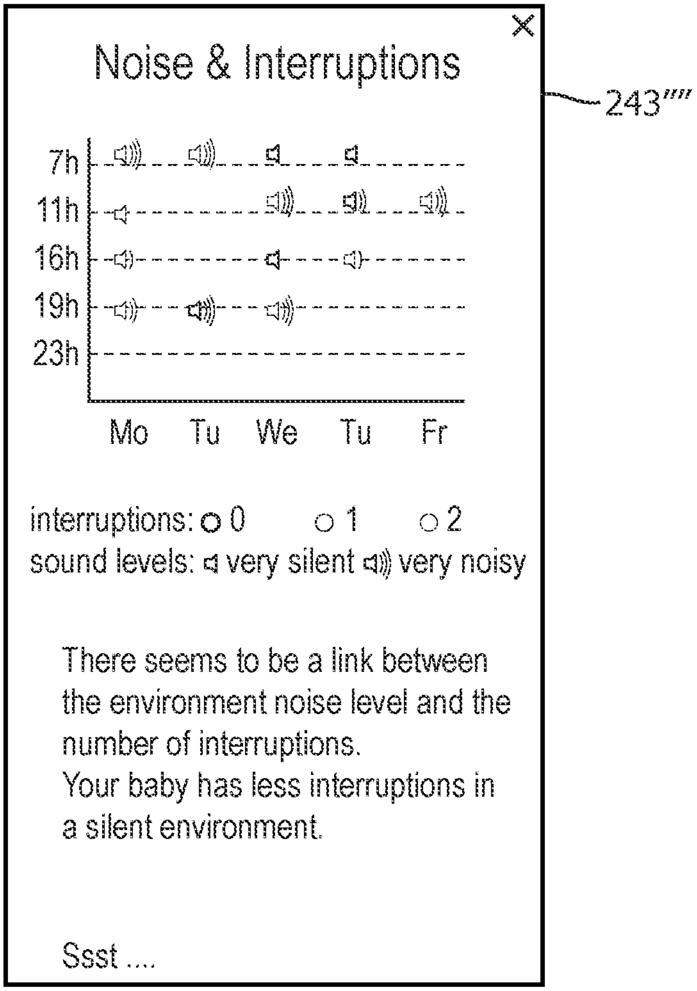
FIG. 14 shows a further example of feeding instructions.

FIG. 14 shows a further example of feeding instructions 243'. In the example shown in FIG. 14 data and instructions relating to a relation between environmental noise and interruptions in the baby's feeding is displayed. This may be useful in a parent's adjusting the conditions under which a baby is fed.

Figure 15:
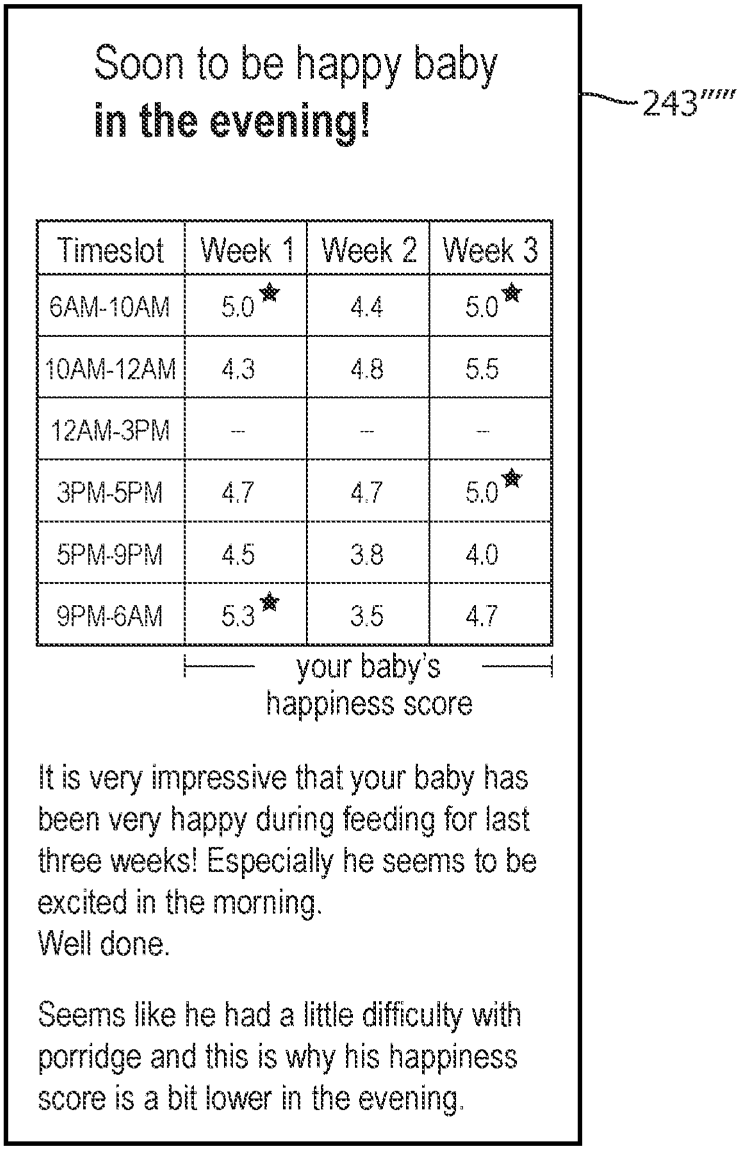
FIG. 15 shows a further example of feeding instructions.

FIG. 15 shows a further example of feeding instructions 243'. In the example shown in FIG. 15 a ranking of the baby's happiness is shown in relation to time and also in relation to the type of food which has been fed to the infant. This may be useful in adjusting how the baby is fed.

Examples may provide for the automated sending of the cards described above. This for example may be performed by using machine learning algorithms, threshold tables can be updated automatically based on data, correlations can be found automatically and sent cards based on these correlations.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

LIST OF REFERENCE NUMERALS

100 infant feeding system
102 bottle
104 sleeve
106 cap
108 nipple
110 space for electronics
200 electronics within sleeve
201 handheld telecommunications device
202 user interface
204 server with feeding database
206 controller
208 processor
208' processor
208" processor
210 hardware interface
212 sensor
212' environmental light sensor
212" accelerometer sensor
212'" environmental sound sensor
214 wireless interface
216 memory
216' memory
216" memory
218 wireless connection
220 network connection
230 machine executable instructions
232 sensor data
234 data packet of feeding data
236 contextual data request
238 rendering of questionnaire
238' rendering of questionnaire
240 user response
242 instructional data
243 feeding instructions
243' feeding instructions
243" feeding instructions
243'" feeding instructions
243"" feeding instructions
243""' feeding instructions
244 pre-generated instructional data elements
246 feeding database
248 contextual data
300 acquire feeding data by measuring the at least one physical property with the at least one sensor
302 send the feeding data to a feeding database 304 receive a user response descriptive of feeding conditions from a user interface 306 send contextual data to the feeding database, wherein the contextual data comprises the user response 308 receive instructional data from the feeding database in response to the contextual data and the feeding data 310 output feeding instructions on the user interface using the instructional data 400 receive a contextual data request from the feeding database in response to the feeding data 402 display a questionnaire on the user interface in response to receiving the contextual data request 500 display 700 time line 702 acquisition time period 704 feeding data 706 predetermined time range 708 activity profile, noise profile, or ambient light profile 800 data analytics 1000 region to click for more information

The invention claimed is:

1. An infant feeding system for orally feeding a liquid to an infant, wherein the infant feeding system comprises:
- a smart feeding bottle comprising:
  - at least one sensor configured to measure at least one physical property from the smart feeding bottle; and
  - a transmitter configured to transmit information regarding said measured at least one physical property;
- a user interface configured to transmit feeding data regarding a feeding session of said infant; and
- a server comprising:
  - a memory configured to store machine executable instructions; and
  - a processor configured to access the machine executable instructions within said memory, wherein execution of the machine executable instructions causes the processor to:
    - receive the transmitted said measured at least one physical property;
    - receive said feeding data;
    - access a feeding database based on the received measured at least one physical property and said feeding data;
    - receive instructional data from the feeding database, wherein the instructional data includes data determined by analyzing the feeding data and the at least one physical property measured using the at least one sensor;
    - transmit the received instructional data to said user interface; and
    - transmit a contextual data request to said user interface;
- wherein the user interface is configured to display a questionnaire in response to the transmitted contextual data request, wherein said questionnaire is constructed from the instructional data transmitted to said user interface, and wherein said questionnaire is customized in response to said feeding data and the at least one physical property measured by the at least one sensor.

2. The infant feeding system of claim 1, wherein the feeding database is configured to use a pattern recognition algorithm with the contextual data and the feeding data to select the instructional data from pre-generated instructional data elements.

3. The infant feeding system of claim 2, wherein the pattern recognition algorithm comprises a trained neural network, a decision tree, an expert system, or a cluster algorithm.

4. The infant feeding system of claim 1, wherein the at least one sensor comprises a temperature sensor for measuring a temperature of the liquid, an accelerometer sensor for measuring an orientation of the infant feeding system, an environmental light sensor for measuring an ambient light level, an environmental sound sensor for measuring an ambient sound level, a force sensor for measuring a weight of the liquid, or a combination thereof.

5. The infant feeding system of claim 4, wherein execution of the machine executable instructions further causes the processor to determine an acquisition time period during which the feeding data is acquired, wherein the acquisition time period is determined by applying at least one predetermined criterion to data measured by the at least one sensor.

6. The infant feeding system of claim 1, wherein the contextual data comprises a user's response or activity profile, wherein the activity profile is within a predetermined time range before acquiring the feeding data, and wherein the predetermined time range is before the acquisition time period.

7. The infant system of claim 1, wherein the contextual data comprises a noise profile within a predetermined time range before acquiring the feeding data, and wherein the predetermined time range is before the acquisition time period.

8. The infant feeding system of claim 1, wherein the contextual data comprises an ambient light profile within a predetermined time range before acquiring the feeding data.

9. The infant feeding system of claim 1, wherein a combination of the feeding data and the contextual data are used to select the instructional data, wherein the instructional data provides feedback on the feeding session.

10. An infant feeding system for orally feeding a liquid to an infant, wherein the infant feeding system comprises:
- a user interface configured to transmit feeding data regarding a feeding session of said infant;
- a server comprising:
  - a memory configured to store machine executable instructions;
- a processor configured to access the machine executable instructions within said memory, wherein execution of the machine executable instructions causes the processor to:
  - receive from a transmitter, information regarding at least one physical property measured by a sensor of a smart feeding bottle, wherein the sensor is configured to measure the at least one physical property from the smart feeding bottle;
  - receive said feeding data;
  - access a feeding database based on the received measured at least one physical property and said feeding data;
  - receive instructional data from the feeding database, wherein the instructional data includes data determined by analyzing the feeding data and the at least one physical property measured by the sensor;
  - transmit the received instructional data to said user interface; and
  - transmit a contextual data request to said user interface;
- wherein the user interface is configured to display a questionnaire in response to the transmitted contextual data request, wherein said questionnaire is constructed from the instructional data transmitted to said user interface, and wherein said questionnaire is customized in response to said feeding data and the at least one physical property measured by the sensor.

11. The infant feeding system of claim 10, wherein the feeding database is configured to use a pattern recognition algorithm with the contextual data and the feeding data to select the instructional data from pre-generated instructional data elements.

12. The infant feeding system of claim 11, wherein the pattern recognition algorithm comprises a trained neural network, a decision tree, an expert system, or a cluster algorithm.

13. The infant feeding system of claim 10, wherein the at least one sensor comprises at least one of a temperature sensor for measuring a temperature of the liquid, an accelerometer sensor for measuring an orientation of the infant feeding system, an environmental light sensor for measuring an ambient light level, an environmental sound sensor for measuring an ambient sound level, and a force sensor for measuring a weight of the liquid.

14. The infant feeding system of claim 13, wherein execution of the machine executable instructions further causes the processor to determine an acquisition time period during which the feeding data is acquired, wherein the acquisition time period is determined by applying at least one predetermined criterion to data measured by the at least one sensor.

15. The infant feeding system of claim 14, wherein execution of the instructions further causes the processor to determine a profile through the at least one sensor.

16. The infant feeding system of claim 10, wherein the contextual data comprises at least one of:

a user's response or activity profile, wherein the activity profile is within a first predetermined time range before acquiring the feeding data, and wherein the first predetermined time range is before the acquisition time period;

a noise profile, wherein the noise profile is within a second predetermined time range before acquiring the feeding data, and wherein the second predetermined time range is before the acquisition time period; or an ambient light profile, wherein the ambient light profile is within a third predetermined time range before acquiring feeding data.

17. The infant feeding system of claim 10, wherein a combination of the feeding data and the contextual data are used to select the instructional data, wherein the instructional data provides feedback on the feeding session.

* * * * *